Patented Dec. 18, 1923.

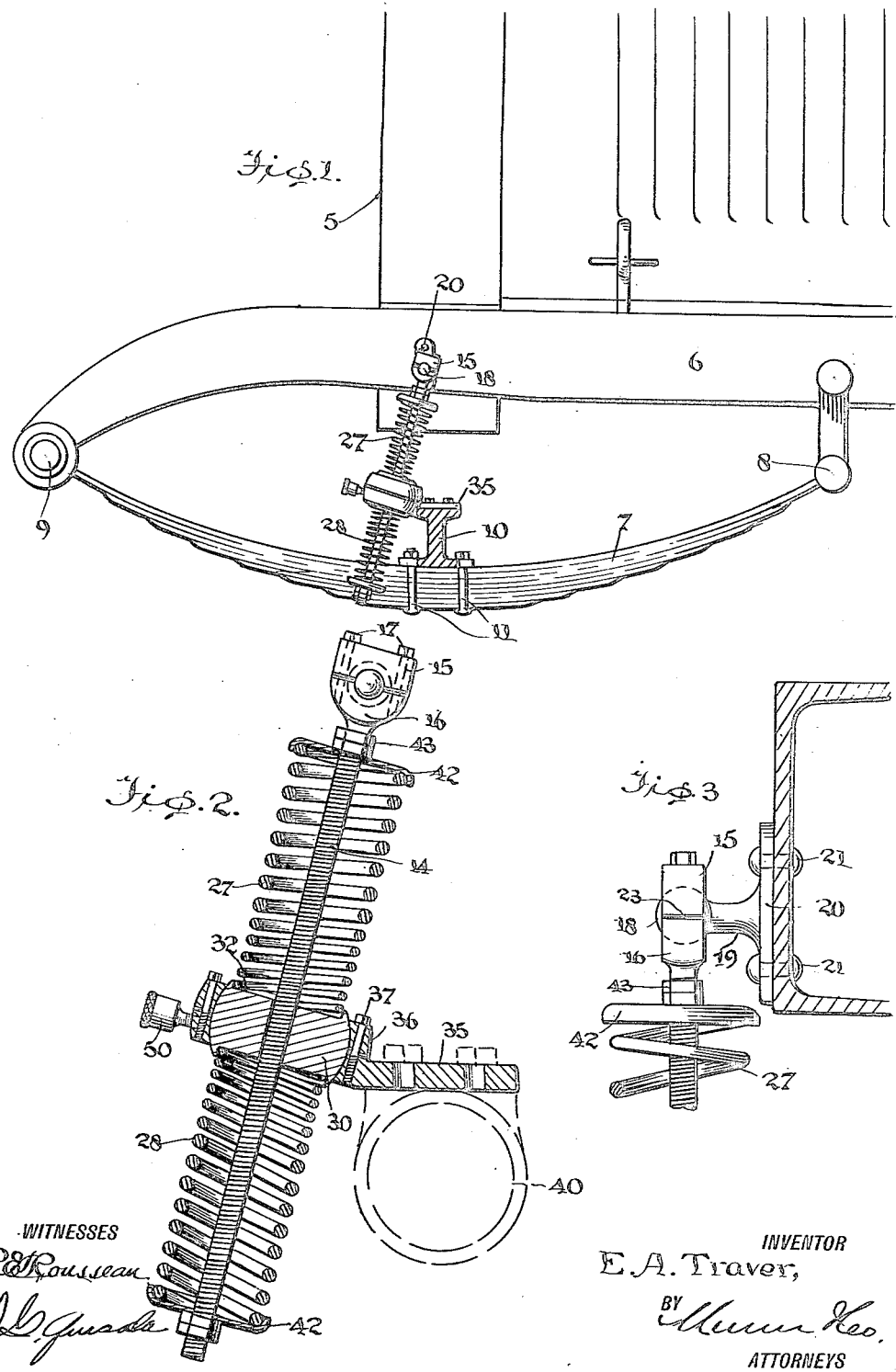

1,477,791

UNITED STATES PATENT OFFICE.

ERNEST A. TRAVER, OF THORNTON, CALIFORNIA.

SHOCK ABSORBER.

Application filed February 15, 1922. Serial No. 536,701.

*To all whom it may concern:*

Be it known that I, ERNEST A. TRAVER, a citizen of the United States, and resident of Thornton, in the county of San Joaquin and State of California, have invented certain new and useful Improvements in Shock Absorbers, of which the following in a specification.

This invention relates to shock absorbers especially adapted for application to motor vehicles.

An important object of this invention is to provide a shock absorber having novel means whereby the shocks incident to the travel of the vehicle over rough roads may be reduced to a minimum.

Also the invention aims to provide a shock absorber wherein the springs of the same are provided with means to absorb the major and minor shocks in a highly efficient manner so that travel in the vehicle equipped with the shock absorber will be rendered more comfortable.

A further object is to provide a shock absorber which is simple to apply, durable in use and cheap to manufacture.

Other objects and advantages will be apparent during the course of the following description.

In the accompanying drawing forming a part of this application and in which like numerals are employed to designate like parts throughout the same, Figure 1 is a side elevation of the improved shock absorber applied.

Figure 2 is a vertical sectional view through the same applied to the rear axle of a motor vehicle.

Figure 3 is a detail view illustrating the means for securing the improved shock absorber to the frame of the vehicle.

In the accompanying drawings wherein for the purpose of illustration is shown the preferred embodiment of the invention, the numeral 5 generally designates a vehicle having the usual frame 6 to which the semi-elliptical spring 7 is connected as indicated at 8 to 9. While a semi-elliptical spring 7 has been illustrated, it is obvious that a spring of any desired type such as a three quarter or full elliptical spring may be employed. The axle 10 may be connected to the vehicle by means of clips 11.

The invention forming the subject matter of this application resides in a rod 14 having its upper portion formed with an enlargement consisting of upper and lower sections 15 and 16 respectively which as illustrated in Figure 2 are connected by fastening bolts 17. The opposed sides of the sections 15 and 16 are formed with recesses to define a socket for the reception of a sphere shaped head 18 carried by the shank 19 of a bracket, the said bracket being provided with an attaching plate 20 secured to the frame of the vehicle by rivets or other fastening devices 21. A plurality of pins 23 may be located between the sections 15 and 16 and may be removed for the purpose of taking up wear between the head 18 and the enlargement on the upper end of the rod 14.

Upper and lower springs 27 and 28 are mounted upon the rod 14 and the adjacent ends of the springs engage an annular spring seat 30 which is slidably mounted on the rod 14. The annular spring seat 30 is formed with oppositely arranged recesses 32 into which the adjacent ends of the springs 27 and 28 are extended.

With reference to Figures 1 and 2 it will be observed that a bracket 35 is provided with an annulus having a socket for the reception of the annular seat 30 and the said annulus consists of a pair of sections 36 connected by means of screw bolts 37 or other suitable fastening devices. It will be seen that the inner side of the annulus formed by the sections 36 is concaved so as to conform to the curvature of the annular seat 30. This permits a slight rocking motion between the annulus 30 and the bracket 35 when the spring 7 is flexed.

The bracket 35 may be secured to the front axle 10 as illustrated in Figure 1 or it may be secured to the rear axle 40 as illustrated in Figure 2.

In carrying out the invention the ends of the springs 27 and 28 are provided with caps 42 held in position by means of nuts 43 threaded on the rod 14. The nuts 43 form a means to tension the springs 27 and 28 and to adjust a shock absorber with relation to the associated parts of the motor vehicle. The springs 27 and 28 gradually decrease in strength and in their resisting qualities toward the spring seat 30 as the convolutions adjacent the inner ends of the springs are decreased in thickness by a drawing or other process.

In operation the convolutions adjacent the inner ends of the springs absorb the minor shocks while the convolutions adjacent the outer ends of the springs come into play when the shock absorber is subjected to a major shock.

The improved shock absorber stabilizes the action of the semi-elliptical spring 7 and renders travel in the vehicle more comfortable. The improved shock absorber may be conveniently applied to a motor vehicle without elaborately changing the construction of the same and also by reason of the few parts employed the cost of manufacture is comparatively small.

As illustrated in Figure 2 the rod 14 is threaded throughout its length so that the nut 43 on the upper portion of the rod 14 may be removed when desired. A suitable grease cup 50 may be threaded on the annulus of the bracket 35 for supplying the lubricant to the annulus 30.

Having thus described the invention, what is claimed is:—

A shock absorber for motor vehicles comprising a rod having its upper portion formed with an enlargement including a pair of sections the opposed faces of which are formed with semi-spherical recesses defining a spherical socket, a bracket rigidly secured to the frame of the vehicle and having a lateral shank provided with a spherical head received in said spherical socket, whereby a universal connection is provided between the rod and the frame, an abutment providing spring seats and slidably mounted on the intermediate portion of said rod, said abutment having a spherical outer surface, coil springs mounted on said rod on opposite sides of said abutment and engaging at their inner ends the seats in the abutment, caps mounted on the end portions of said rod and engaged with the outer ends of said springs, adjusting nuts threaded on said rod and engaging said caps for varying the tension of said springs, said coil springs decreasing in strength toward their inner ends, a second bracket rigidly secured to the axle of the vehicle and offset therefrom and having an annulus provided with a spherical socket receiving said abutment, whereby a universal connection is provided between the annulus and the abutment.

ERNEST A. TRAVER.